(12) United States Patent
Han

(10) Patent No.: US 12,392,320 B2
(45) Date of Patent: Aug. 19, 2025

(54) VERTICAL AXIS WIND TURBINE GENERATOR

(71) Applicant: Kyung Hee Han, Yonginsi (KR)

(72) Inventor: Kyung Hee Han, Yonginsi (KR)

( * ) Notice: Subject to any disclaimer, the term of this patent is extended or adjusted under 35 U.S.C. 154(b) by 0 days.

(21) Appl. No.: 18/517,373

(22) Filed: Nov. 22, 2023

(65) Prior Publication Data

US 2024/0175421 A1 May 30, 2024

(30) Foreign Application Priority Data

Nov. 24, 2022 (KR) .................. 10-2022-0158851

(51) Int. Cl.
*F03D 3/00* (2006.01)
*F03D 3/06* (2006.01)

(52) U.S. Cl.
CPC ............ *F03D 3/062* (2013.01); *F03D 3/005* (2013.01); *F05B 2240/211* (2013.01); *F05B 2250/71* (2013.01)

(58) Field of Classification Search
CPC . F03D 3/062; F03D 3/005; F03D 3/02; F03D 3/061; F03D 3/067; F03D 9/25; F03D 9/43; F03D 9/45; F03D 13/20; F03D 80/00; F05B 2240/211; F05B 2260/503; F05B 2240/31; F05B 2250/71; F05B 2240/302; Y02E 10/74
See application file for complete search history.

(56) References Cited

U.S. PATENT DOCUMENTS

2005/0244271 A1\* 11/2005 Kinpara .................. F03D 13/20
  416/132 B
2010/0109337 A1\* 5/2010 Wang ...................... F03D 3/067
  290/55

\* cited by examiner

*Primary Examiner* — Julio C. Gonzalez
(74) *Attorney, Agent, or Firm* — Park & Associates IP Law Office

(57) ABSTRACT

The present invention relates to a vertical axis wind turbine generator in which a rotor blade (120) divided into a fixed blade (120*a*) and movable blades (120*b*, 120*c* and 120*d*) is connected to a rotor blade rotating shaft (110) provided to be vertical, so that backwind power of the rotor blade (120) is enhanced to the maximum, and headwind power is minimized to enable high-efficiency power generation.

1 Claim, 18 Drawing Sheets

VERTICAL AXIS WIND TURBINE GENERATOR

CROSS-REFERENCE TO RELATED APPLICATIONS

This U.S. non-provisional patent application claims priority under 35 U.S.C. § 119 of Korean Patent Application No. 10-2022-0158851, filed on Nov. 24, 2022, the entire contents of which are hereby incorporated by reference.

BACKGROUND

The present invention relates to a wind turbine generator, and more particularly, to a vertical axis wind turbine generator in which a rotary shaft to which a rotor blade is attached to be rotated is vertically provided to generate power.

Most of large-scale installed wind turbine generators are horizontal axis wind turbine generators in which a horizontal shaft is provided and a large-sized blade is mounted on one side of the horizontal shaft. In the horizontal axis wind turbine generators, the blade is attached to one side of the horizontal shaft and is rotated while wind is applied thereto, and thus power generation efficiency is good. However, a rotor blade has a large rotational radius due to a long length thereof, and the long rotor blade rotates to cause the loud noise. Accordingly, the horizontal axis wind turbine generators are not suitable for installation in neighborhood living spaces.

In contrast, vertical axis wind turbine generators may be installed and used on the roofs of buildings or the like on a relatively small scale.

In addition, in the horizontal axis wind turbine generators, only one power generator may be mounted on the horizontal shaft provided in one, but the vertical axis wind turbine generators may be installed as a multi-stage type so that a plurality of power generators are mounted together to produce a relatively large amount of electricity.

However, the vertical axis wind turbine generators have a limitation in which as a rotor blade attached to a vertical shaft rotates around a rotary shaft, a counter-torque wind pressure applied from the wind is generated to reduce torque.

PRIOR ART DOCUMENTS

Patent Documents

Korean Patent Registration No. 10-2448925
Korean Patent Registration No. 10-1498785
Korean Patent Registration No. 10-1483461
Korean Patent Registration No. 10-1554307
Korean Patent Registration No. 10-1325752
Korean Patent Registration No. 10-1722659

SUMMARY

An object of the present invention for solving the above limitations is to provide to a vertical axis wind turbine generator which minimizes a counter-torque wind pressure that is generated when a rotor blade rotates while moving against a wind, and is structurally stable enough to withstand strong wind even when the wind turbine generator is installed as a multi-stage type.

In order to minimize a counter-torque wind pressure that is unavoidably applied to a rotor blade, which is mounted in a wind turbine generator according to the present invention, while the rotor blade rotates, a rotor blade 120 is divided into a fixed blade 120a, in which a wind hole 120e is defined at a center thereof, and movable blades 120b, 120c and 120d, so that when backwind blows, the movable blades close the wind hole 120e of the fixed blade 120a, and when headwind blows, the movable blades open the wind hole 120e of the fixed blade 120a to minimize a wind pressure of the headwind.

When the wind turbine generator is provided as a multi-stage type, a conical frame 130, which is provided as a space so that a power generating device M and an accelerating gear 150 may be embedded between multiple stages, and at least three poles 140 are provided in an outer circumference of the conical frame 130 to extend and be fixed to the ground to enable the wind turbine generator to withstand even strong wind.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings.

DETAILED DESCRIPTION

Hereinafter, the present invention will be described in detail with reference to the accompanying drawings.

Figure 1:
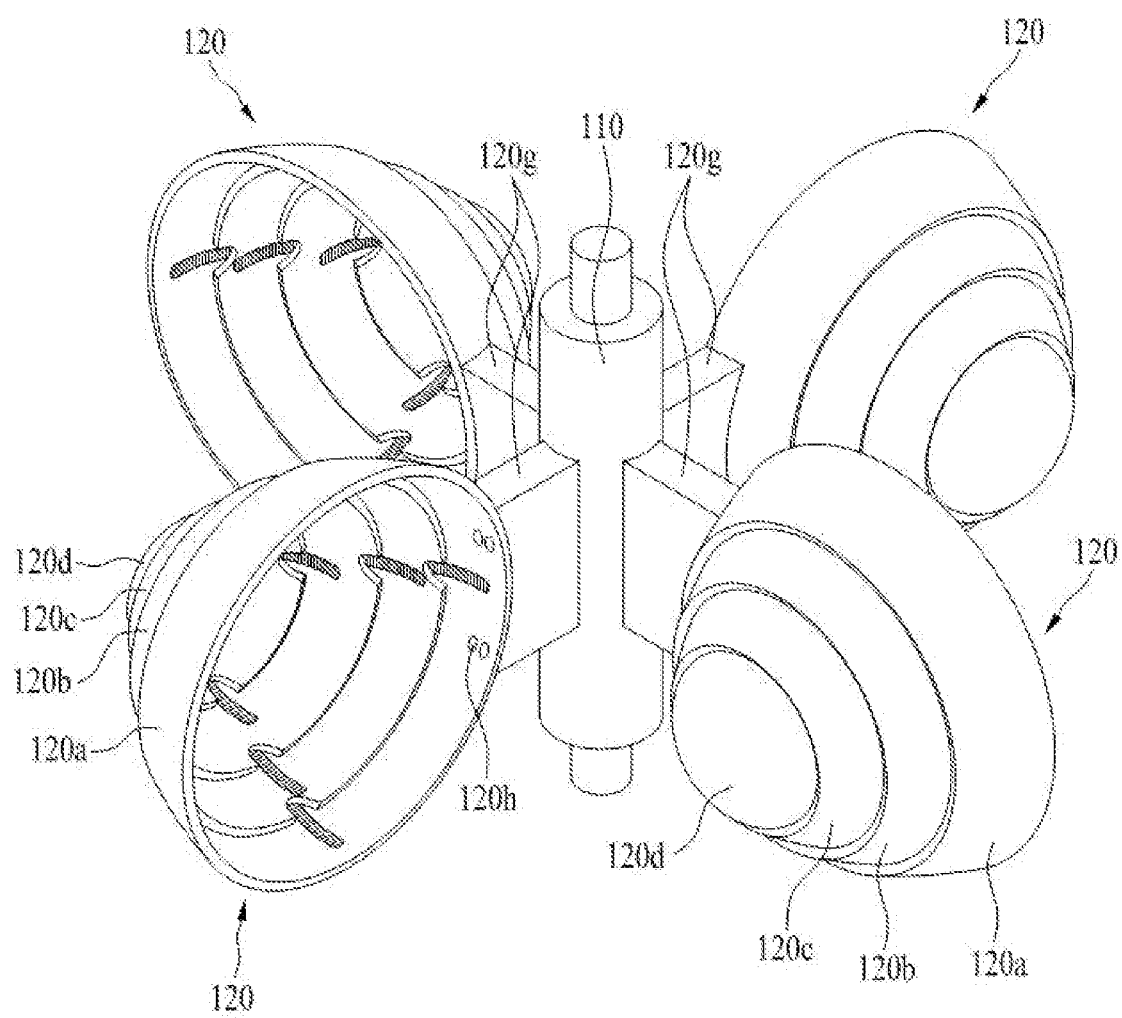
FIG. 1 is a side view of four rotor blades 120 connected to a rotor blade rotating shaft 110 according to the present invention.

FIG. 1 is a side view of four rotor blades 120 each having a circular shape, which are connected to a rotor blade rotating shaft 110 provided to be vertical according to the present invention.

For the sake of convenience of power generation, the rotor blade 120 connected to a vertical shaft is installed to be rotated only in one direction.

In the rotor blade 120 connected to the vertical shaft, due to the characteristic of the vertical shaft, backwind is applied to the rotor blade 120 disposed at the left on the basis of a direction of wind, and headwind is applied to the rotor blade 120 disposed at the right. This operation is repeated while the rotor blade 120 rotates.

In the present invention, in order to achieve functions to increase a wind pressure of the backwind, which is applied to the rotor blade when the rotor blade rotates, to the maximum, and minimize a wind pressure of the headwind as described above. the rotor blade 120 is divided into a fixed blade 120a and movable blades 120b, 120c and 120d.

A wind hole 120e having a circular shape is defined at a center of each of the fixed blade 120a and the movable blades 120b, 120c and 120d. Here, when a plurality of movable blades are combined, the wind hole 120e is not defined in a movable blade to be combined at the last position.

The rotor blade 120 is provided by combining the fixed blade 120a and the movable blades 120b, 120c and 120d. Operations in which the rotor blade 120 is provided through the fixed blade 120a and the movable blades 120b, 120c and 120d will be described as follows.

The fixed blade 120a is connected to a rotor blade rotating shaft 110 through a fixed blade connecting frame 120g. A first movable blade 120b is connected to the inside of the fixed blade 120a through four elastic bands 120f.

Two of the four elastic bands 120f are connected to upper left and right portions of the inside of the fixed blade 120a and upper left and right side surfaces of the first movable blade 120b, and the other two elastic bands 120f are connected to lower left and right portions in the same method.

After the fixed blade 120a is connected to the first movable blade 120b as above, when a wind pressure is generated by the backwind, a portion, which has a small diameter, of the first movable blade 120b is inserted to protrude into the wind hole of the fixed blade 120a, and a portion having a large diameter is in a state of being hooked with the wind hole of the fixed blade 120a.

Continuously, a second movable blade 120c is connected to the inside of the first movable blade 120b through four elastic bands 120f in the same method as the fixed blade 120a and the first movable blade 120b. When a wind pressure is generated by the backwind, a portion, which has a small diameter, of the second movable blade 120c is inserted and protrudes from the wind hole of the first movable blade 120b, and a portion having a large diameter is in a state of being blocked by the wind hole of the first movable blade 120b.

A third movable blade 120d is connected to the inside of the second movable blade 120c through four elastic bands 120f in the same method as above. When a wind pressure is generated by the backwind, a portion, which has a small diameter, of the third movable blade 120d is inserted and protrudes from the wind hole of the second movable blade 120c, and a portion having a large diameter is in a state of being blocked by the wind hole of the second movable blade 120c so that the rotor blade is completed. As described above, when the wind pressure of the backwind is applied, the entire configuration of the rotor blade 120 is provided as a bowl shape to generate the wind pressure of the backwind to the maximum.

Figure 2:
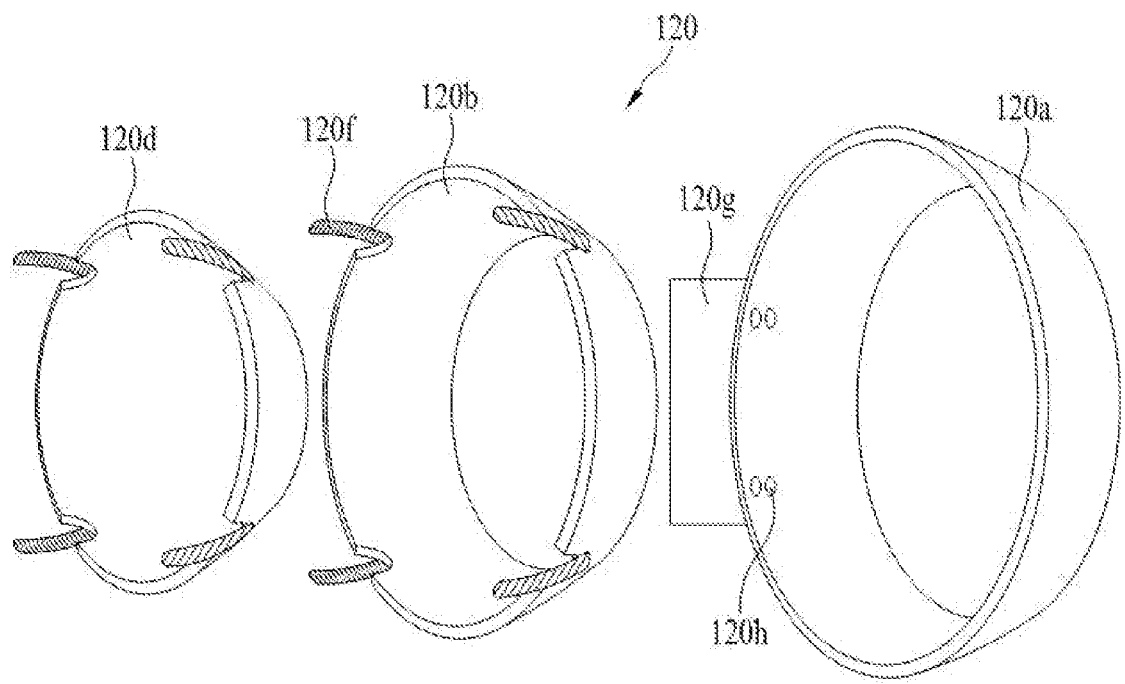
FIG. 2 illustrates a state in which a rotor blade 120 is separated into one fixed blade 120a and two movable blades 120b and 120d according to the present invention.
Figure 3:
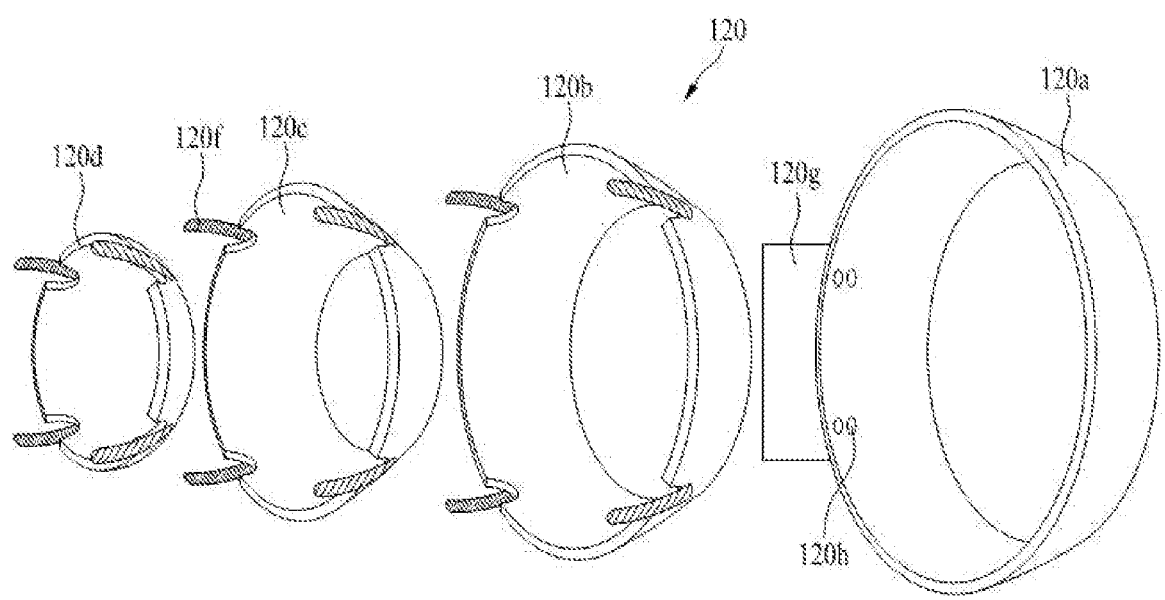
FIG. 3 illustrates a state in which a rotor blade 120 is separated into one fixed blade 120a and three movable blades 120b, 120c and 120d according to the present invention.

FIGS. 2 and 3 are views illustrating a configuration in which the fixed blade 120a and the first, second, and third movable blades 120b, 120c and 120d are separated from each other.

The rotor blade 120 is provided by being divided into one for a large-sized multi-stage tower type, in which three movable blades are mounted, and one for a small-sized one-stage type for neighborhood living spaces, in which one or two movable blades are mounted.

When only one movable blade is mounted, a movable blade in the form of the third movable blade 120d in which a wind hole is not defined is mounted.

Figure 4:
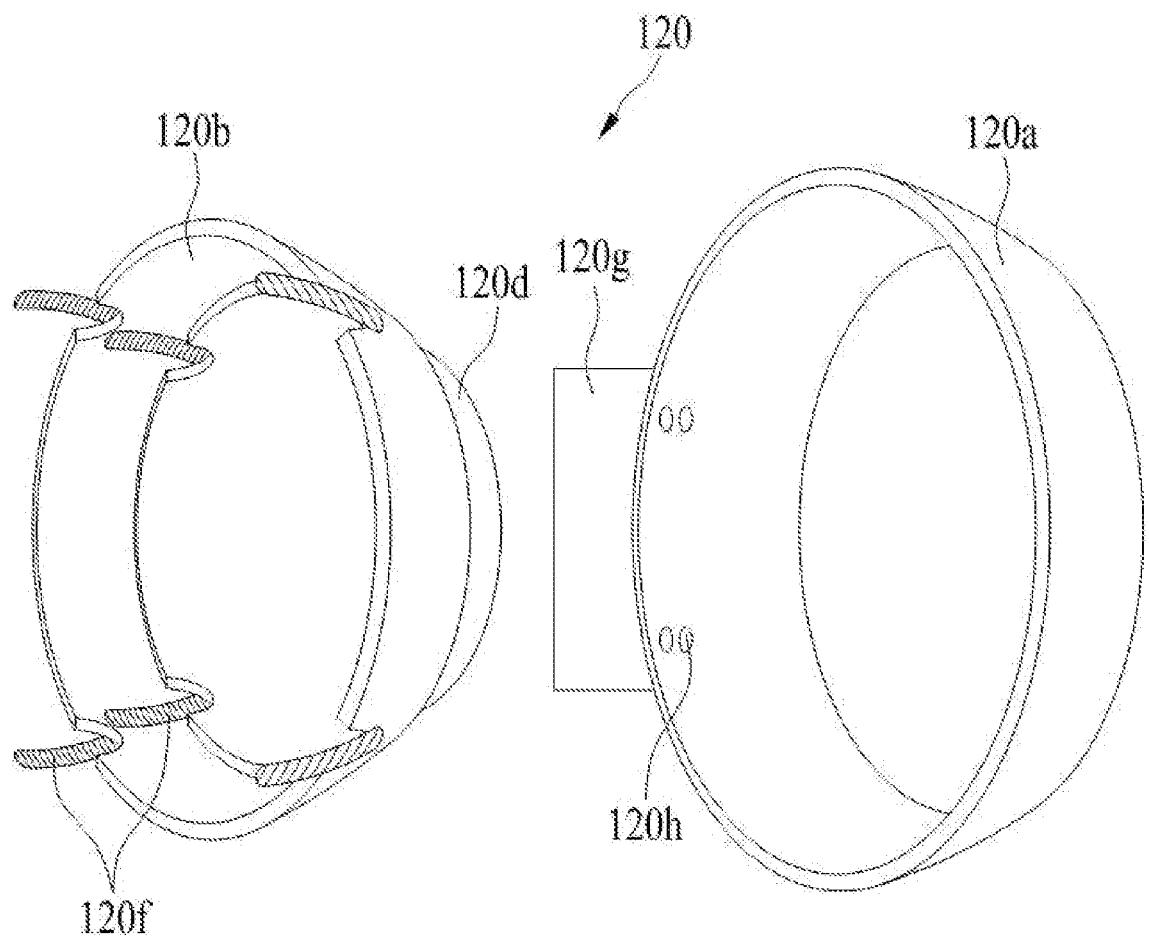
FIG. 4 illustrates a state in which a configuration, in which two movable blades 120b and 120d are combined to have a bowl shape with a closed wind hole, and a fixed blade 120a are separated according to the present invention.

FIG. 4 illustrates a configuration, in which two movable blades are combined to have a bowl shape, and a configuration in which a fixed blade 120a is separated.

Figure 5:
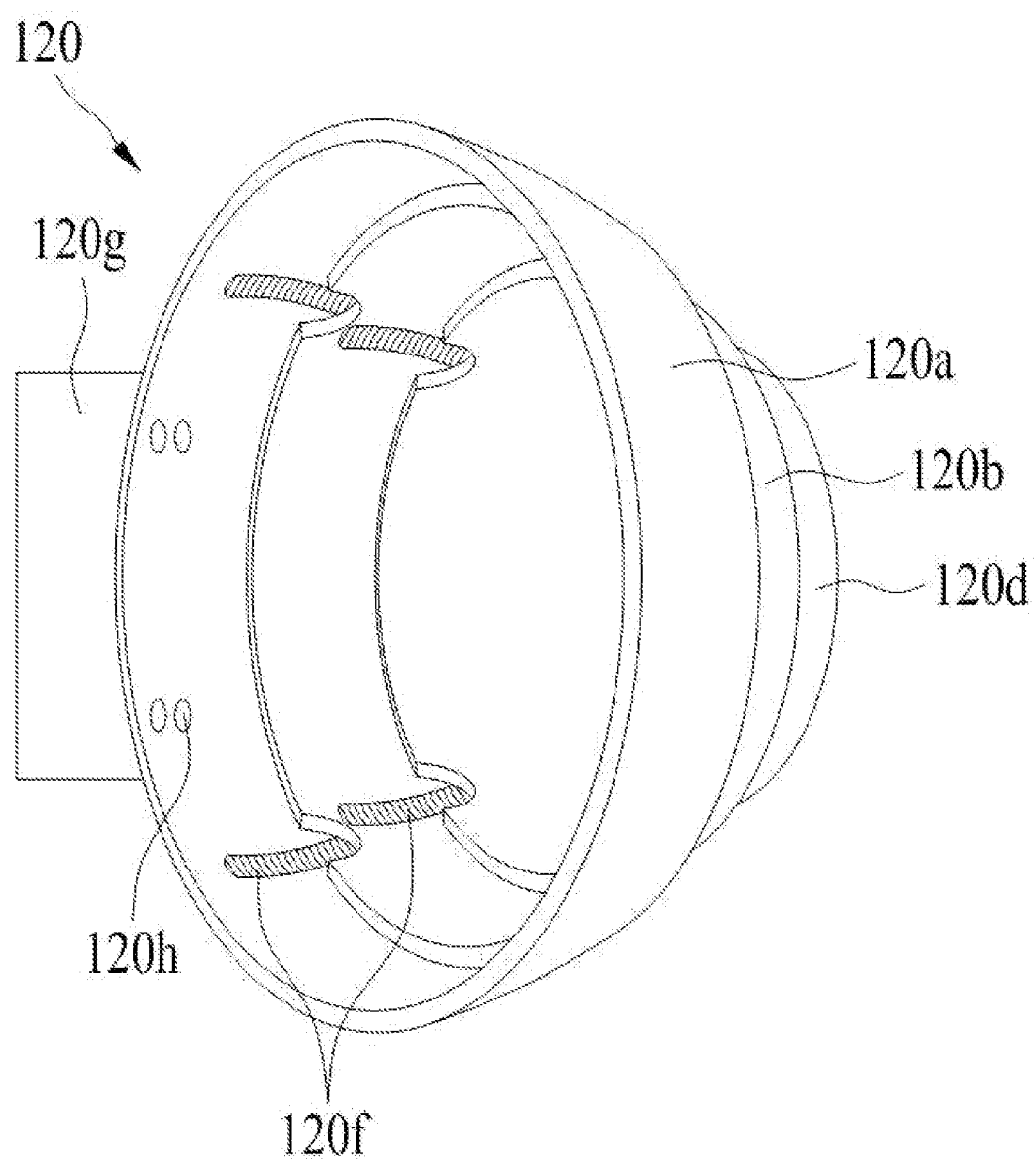
FIG. 5 illustrates a completed rotor blade in which a configuration, in which two movable blades are combined to have a bowl shape, and a fixed blade 120a are combined according to the present invention.

FIG. 5 is a view illustrating a completed rotor blade 120 having a bowl shape with a closed wind hole, in which the two movable blades combined to have a bowl shape are combined with the fixed blade 120a.

Figure 6:
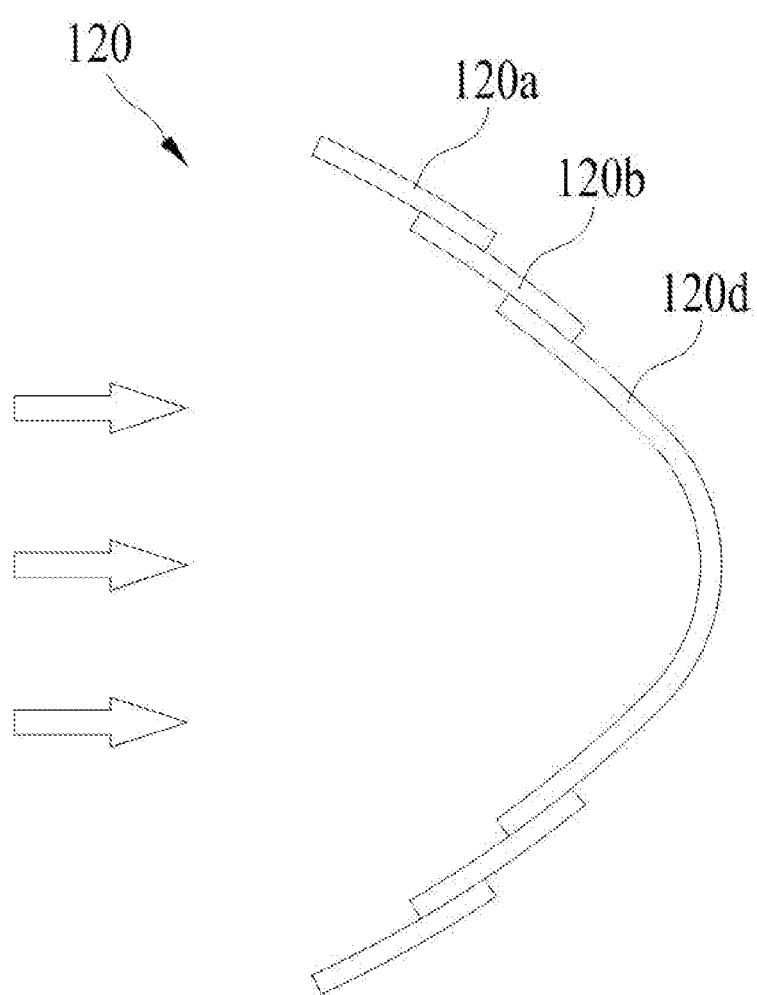
FIG. 6 is a cross-sectional view illustrating a completed rotor blade 120 having a bowl shape according to the present invention.

FIG. 6 is a cross-sectional view of a bowl shape of the rotor blade 120 completed as above.

Figure 7:
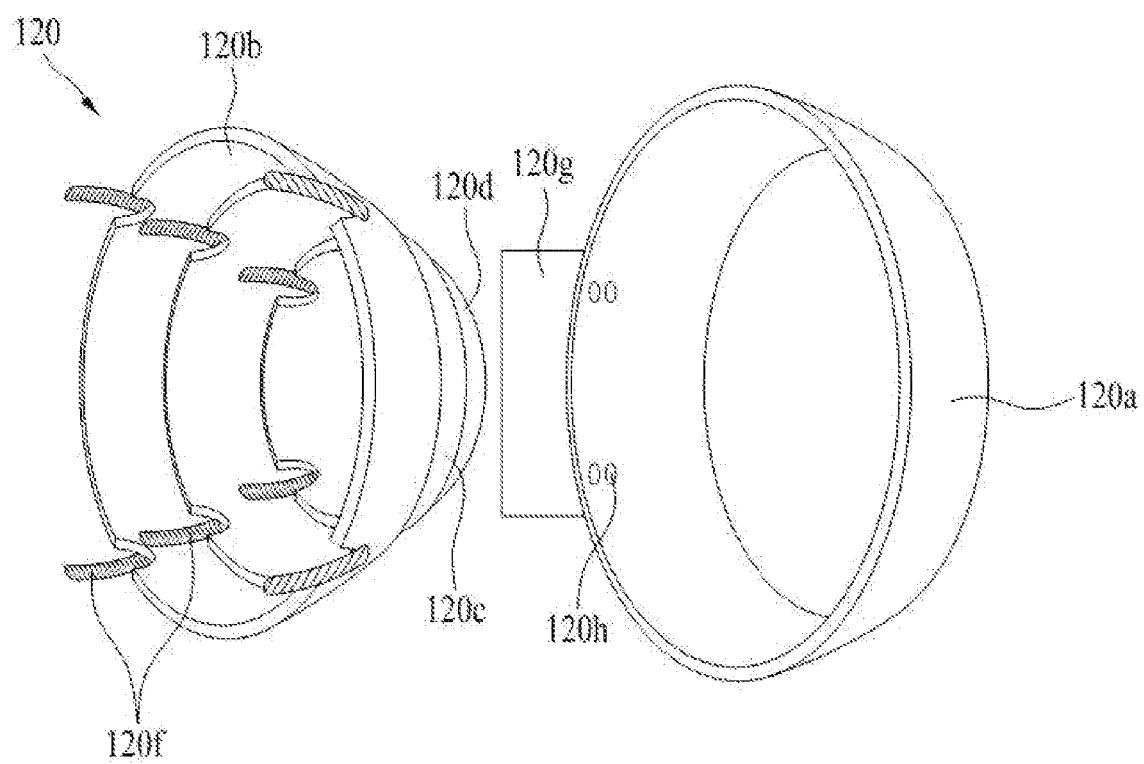
FIG. 7 illustrates a state in which a configuration, in which three movable blades 120b, 120c and 120d are combined to have a bowl shape with a closed wind hole, and a fixed blade 120a are separated according to the present invention.
Figure 8:
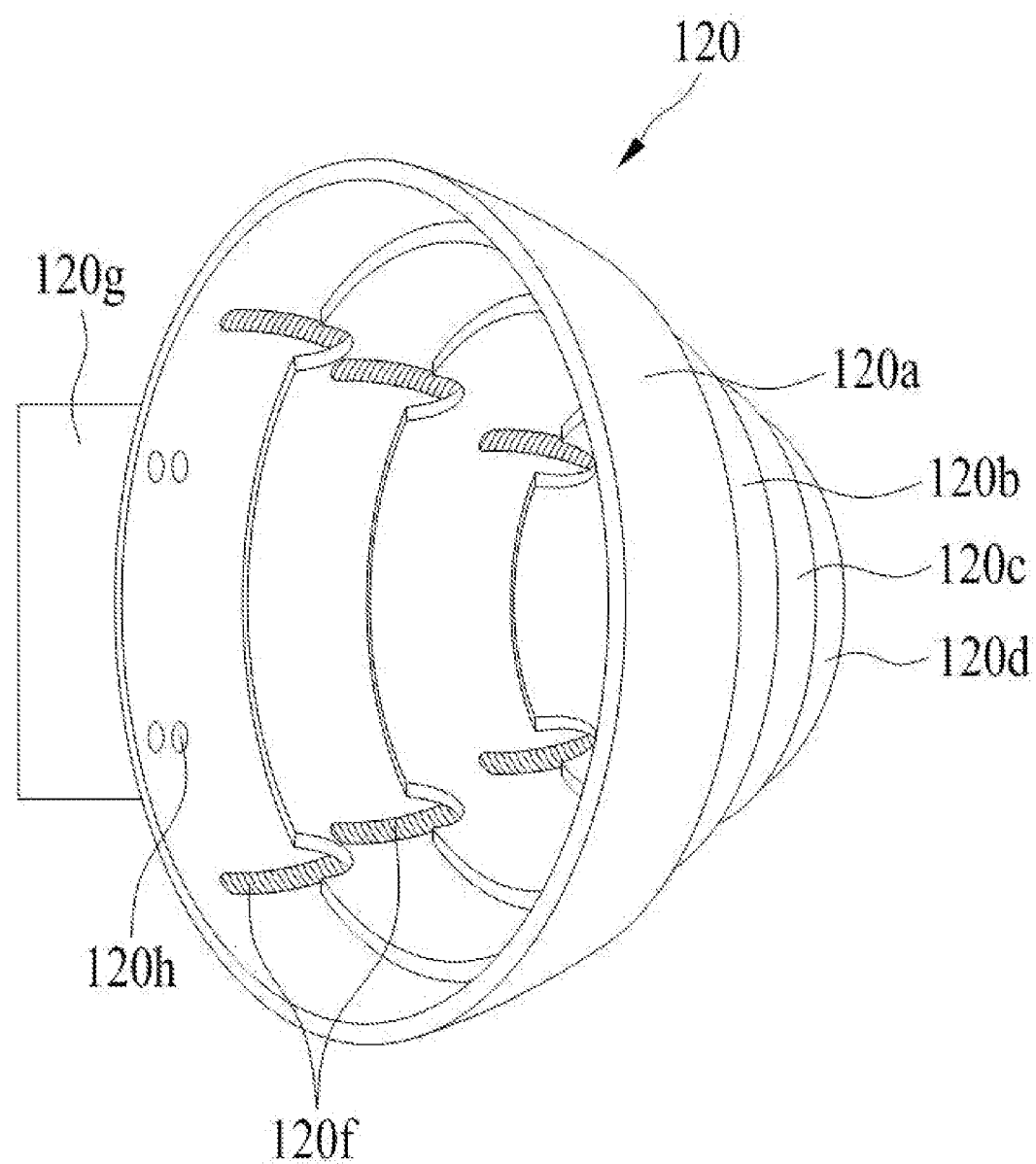
FIG. 8 illustrates a rotor blade 120 having a bowl shape as a whole in which a configuration, in which three movable blades 120b, 120c and 120d combined to have a bowl shape with a closed wind hole, is combined with a fixed blade 120a to have a shape in which the wind hole of the fixed blade 120a is closed according to the present invention.

FIGS. 7 and 8 illustrate a configuration, in which three movable blades 120b, 120c and 120d are combined to have a bowl shape, and a configuration in which ae fixed blade 120a is separated, and illustrate a completed rotor blade 120 having a bowl shape with a closed wind hole, in which the three movable blades combined to have a bowl shape are combined with the fixed blade 120a.

Figure 9:
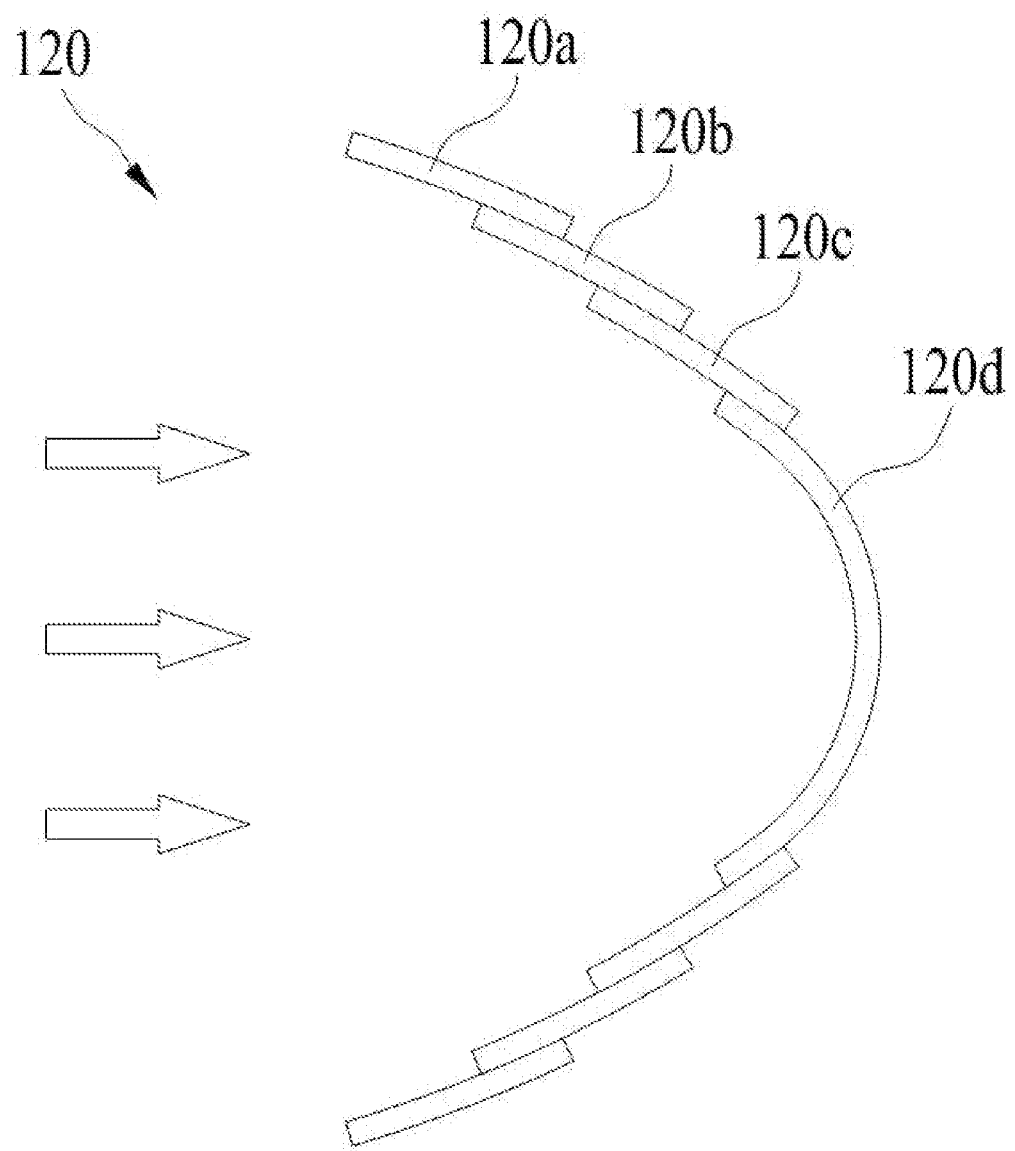
FIG. 9 is a cross-sectional view illustrating a completed rotor blade 120 having a bowl shape according to the present invention.

FIG. 9 is a cross-sectional view of a bowl shape of the rotor blade 120 completed as above.

Figure 10:
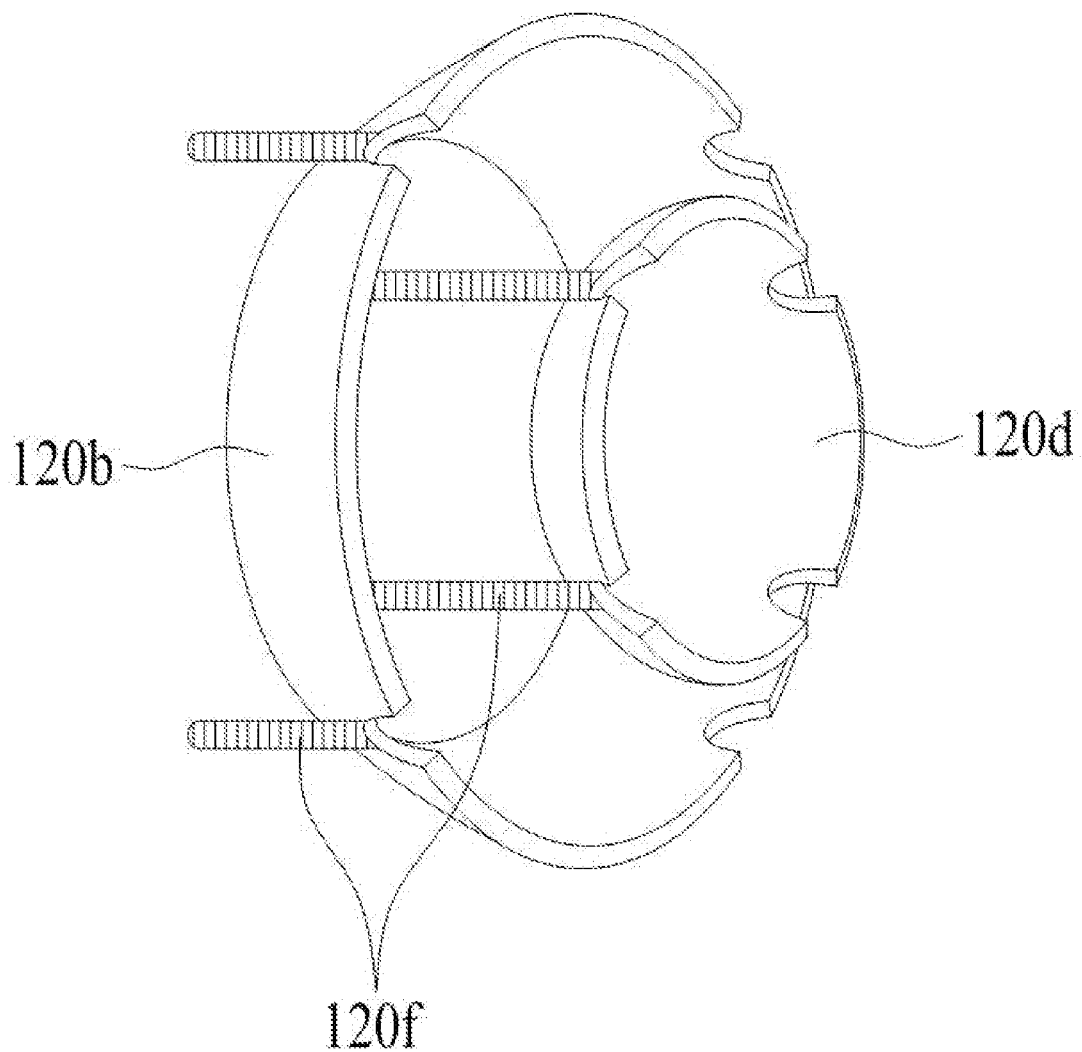
FIG. 10 illustrates an opened state of a wind hole 120e in which two movable blades 120b and 120d connected through an elastic band 120f maintain spacing from each other according to the present invention.
Figure 11:
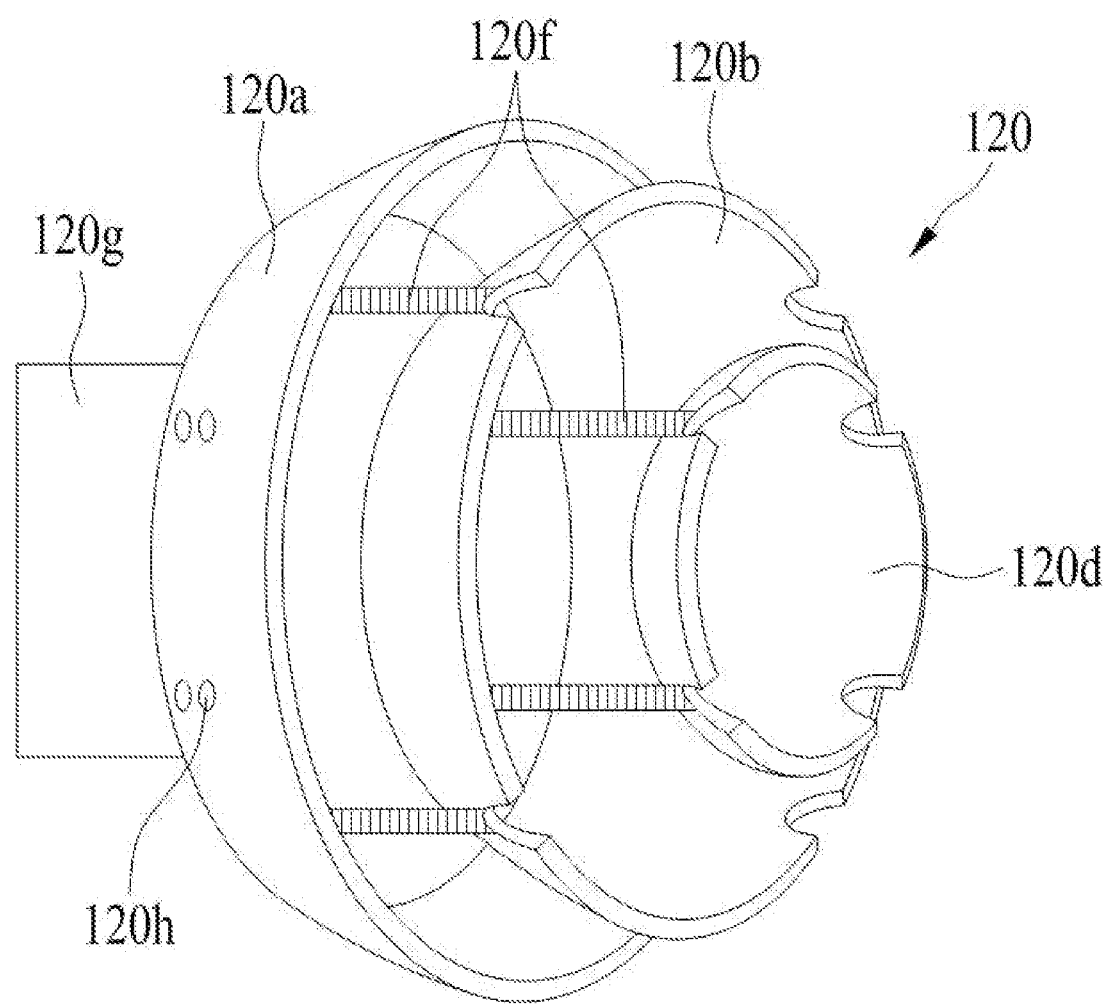
FIG. 11 illustrates a completed rotor blade 120 in an opened state of a wind hole 120e in which two movable blades 120b and 120d connected to have a shape in which the wind hole 120e is opened is connected to a fixed blade 120a according to the present invention.

FIGS. 10 and 11 illustrate two movable blades, which are connected to each other in a state in which the two movable blades to which a headwind pressure has been applied maintain spacing from each other so that the wind hole 120*e* is opened, and a completed rotor blade 120 with the opened wind hole, in which the two movable blades are connected to a fixed blade 120*a*.

Figure 12:
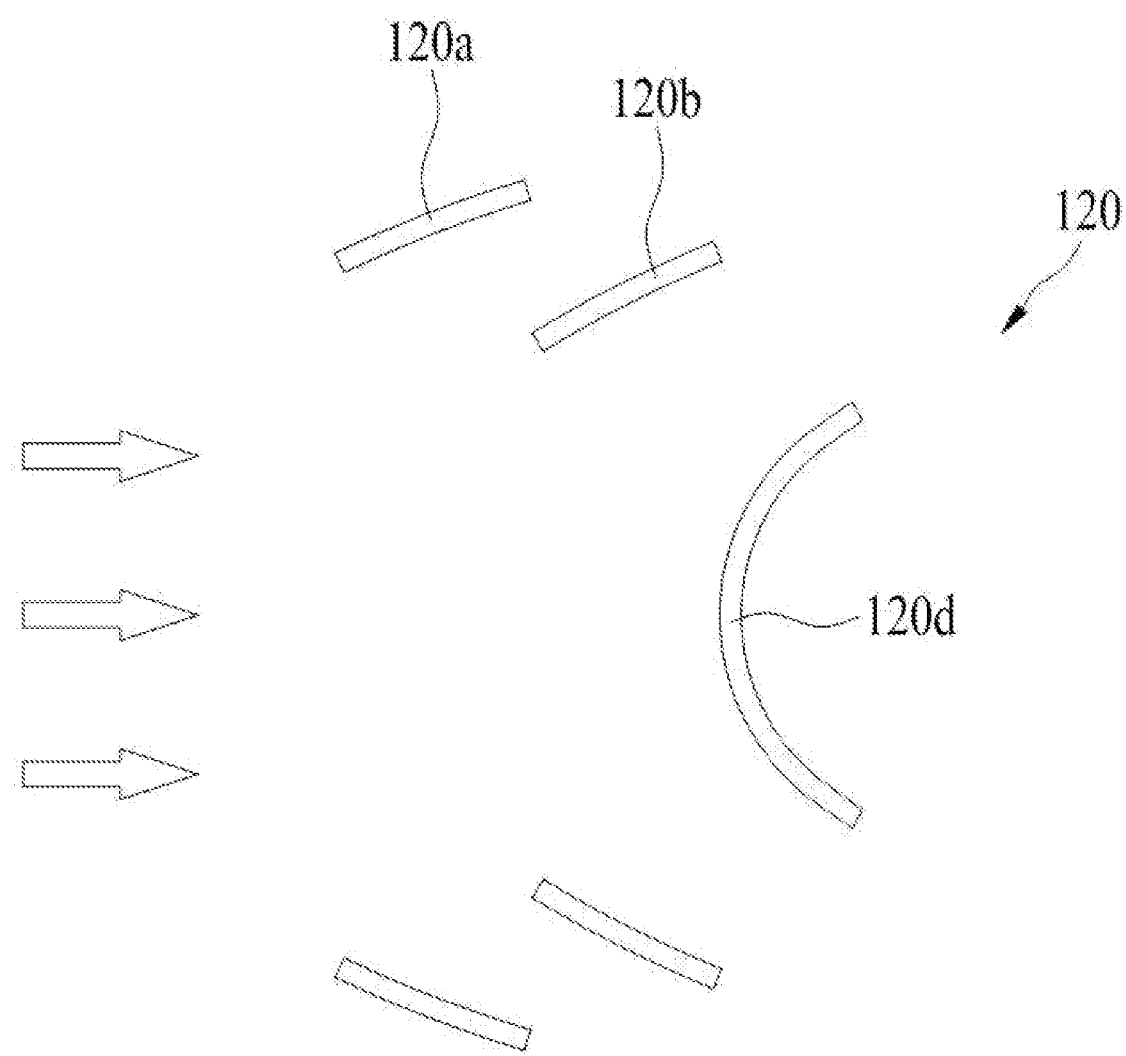
FIG. 12 is a cross-sectional view illustrating a completed rotor blade 120 in an opened state of a wind hole 120e according to the present invention.

FIG. 12 is a cross-sectional view of the rotor blade 120 completed in the state in which the wind hole is opened as above.

Figure 13:
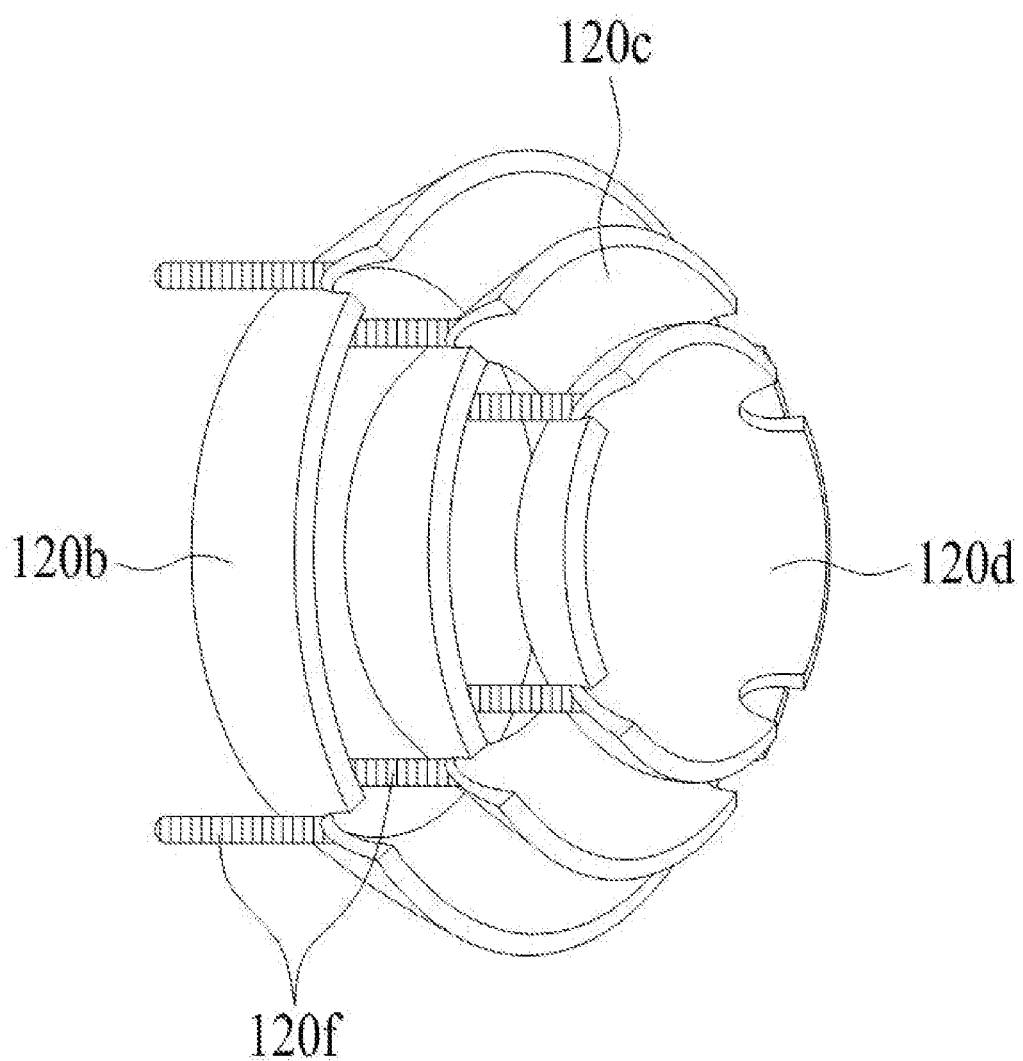
FIG. 13 illustrates an opened state of a wind hole 120e in which three movable blades 120b, 120c and 120d connected through an elastic band 120f are connected to each other with maintaining spacing according to the present invention.
Figure 14:
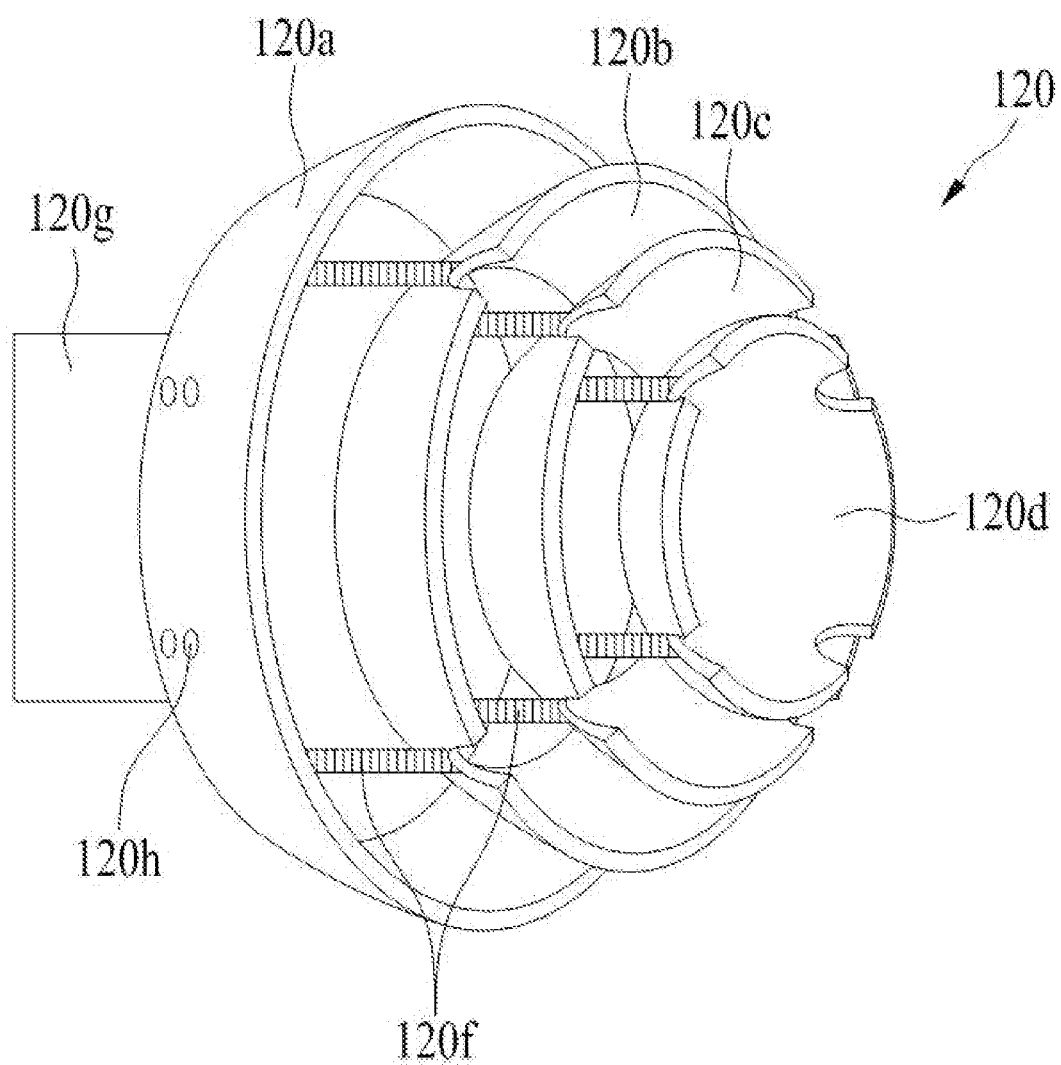
FIG. 14 illustrates a completed rotor blade 120 in an opened state of a wind hole 120e in which three movable blades 120b, 120c and 120d connected to have a shape in which the wind hole 120e is opened are connected to a fixed blade 120a with spacing according to the present invention.

FIGS. 13 and 14 illustrate three movable blades 120*b*, 120*c* and 120*d*, which are connected to each other in a state in which the three movable blades to which a headwind pressure has been applied maintain spacing from each other so that the wind hole 120*e* is opened, and illustrate a completed rotor blade 120 with the opened wind hole in a state in which the three movable blades 120*b*, 120*c* and 120*d* are connected to a fixed blade 120*a*.

Figure 15:
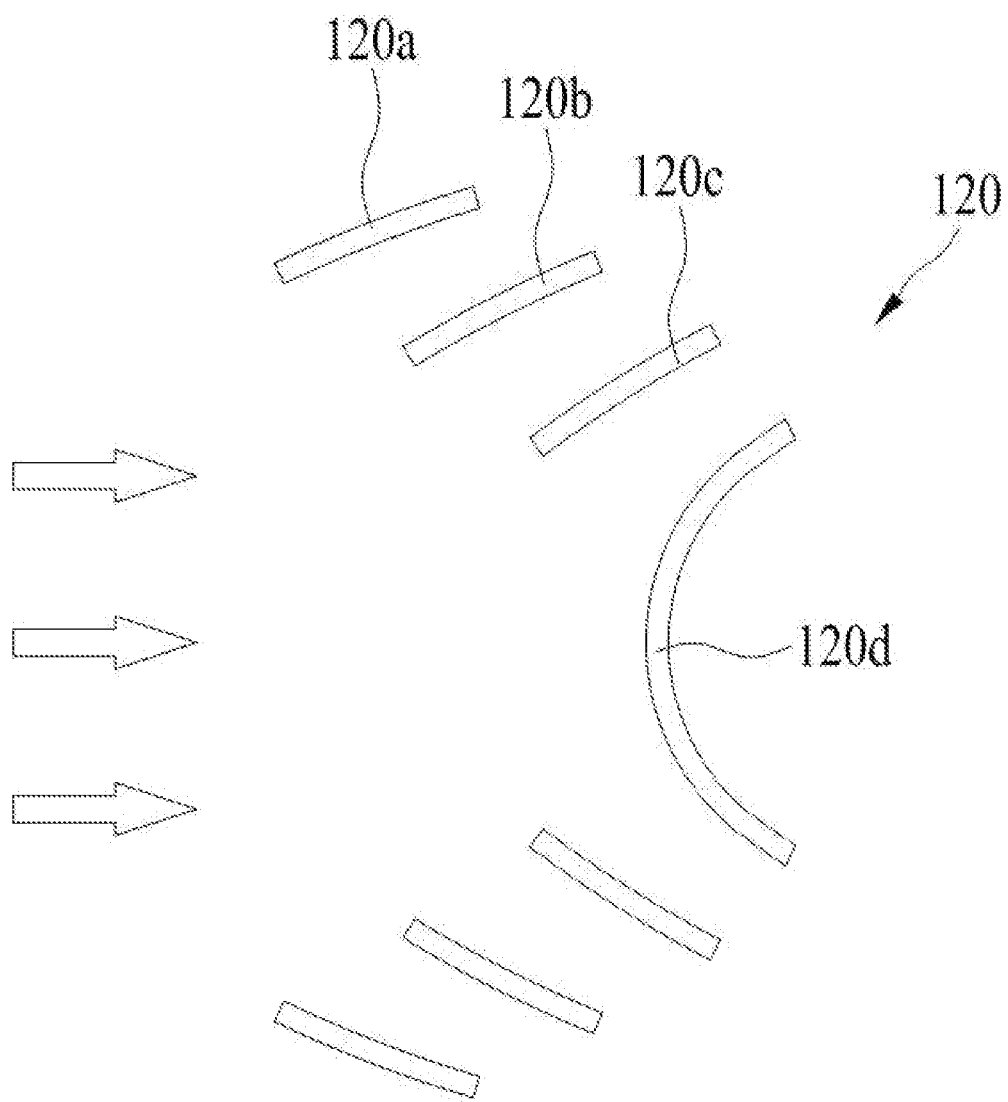
FIG. 15 is a cross-sectional view illustrating a completed rotor blade 120 in an opened state of a wind hole according to the present invention.

FIG. 15 is a cross-sectional view of a bowl shape of the rotor blade 120 completed as above.

As described above, the rotor blade 120 is provided by being divided into the fixed blade 120*a* and the movable blades 120*b*, 120*c* and 120*d*. When the rotor blade 120 is disposed at the left on the basis of the direction of the wind while rotating, the backwind is applied to the rotor blade 120, and when the rotor blade 120 is disposed at the right, the headwind is applied to the rotor blade 120. In the rotor blade 120 to which the backwind is applied, the movable blades 120*b*, 120*c* and 120*d* are combined to each other in a state of closing the wind hole 120*e* inside the fixed blade 120*a* so that the rotor blade 120 as a whole has a bowl shape, and in the rotor blade 120 to which the headwind is applied, the movable blades are connected to each other with maintaining spacing inside the fixed blade 120*a* so that the rotor blade 120 has a shape in which the wind hole 120*e* is opened.

The vertical axis wind turbine generator according to the present invention is based on a fundamental principle that at least three rotor blades 120 are connected to the rotor blade rotating shaft 110, which is provided to be vertical, at fixed intervals and rotate to generate power.

Here, the rotor blade 120 rotates by being connected to the rotor blade rotating shaft 110 provided to be vertical. Thus, when being at a position of the backwind on the basis of a direction of wind, the rotor blades 120 rotates while backwind is applied thereto, and when being at a position of the headwind, the rotor blades 120 rotates while the headwind is applied. This rotation is repeated.

Therefore, in order to maintain high-efficiency power generation, the vertical axis wind turbine generator according to the present invention needs to maintain the wind pressure of the backwind, which is applied to the rotor blade 120, to be the maximum, and minimize the wind pressure of the headwind.

In order that the wind pressure is applied to the rotor blade 120 to the maximum, as described above, the rotor blade 120 has a bowl shape, which has an inlet that is wide as the movable blades 120*b*, 120*c* and 120*d* are continuously in contact with each other inside the fixed blade 120*a*, and which is sealed as the wind hole 120*e* is closed. Accordingly, when the wind is concentrated into the bowl without escaping, the wind pressure is generated to the maximum. In order to minimize the wind pressure of the headwind applied to the rotor blade 120, the movable blades are in a state of maintaining spacing from the fixed blade 120*a*, and also the movable blades are made maintain spacing from each other. Accordingly, the wind hole 120*e* is opened so that when the wind escapes with the minimum resistance, the wind pressure is generated to the minimum.

Each of the movable blade may be made of a light material, so that even due to a small wind pressure, the movable blade rapidly moves to close or open the wind hole, and the fixed blade may be made of a firm material so that the fixed blade withstands even strong wind.

As described above, when the backwind blows, the maximum wind pressure is applied to the rotor blade 120, and when the headwind blows, the minimum wind pressure is applied to the rotor blade 120. Accordingly, the maximum torque is generated to enable the maximum power generation.

Figure 16:
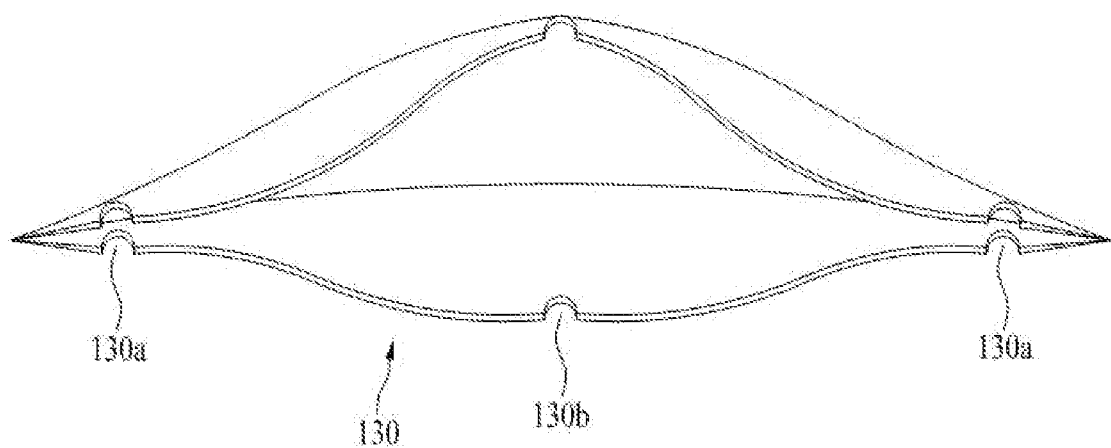
FIG. 16 is a view illustrating the inside of a conical frame 130, which is installed in each of multiple stages and provided as a space, in which a power generating device M and an accelerating gear 150 are mounted, when a vertical axis wind turbine generator is installed as a multi-stage type according to the present invention.

FIG. 16 is a view illustrating a conical frame 130, which is installed between multiple stages and provides a space in which a power generating device M and an accelerating gear 150 are mounted, when the vertical axis wind turbine generator according to the present invention is provided as a multi-stage tower type, and which has an outer circumference in which a pole hole 130*a* is defined and through which at least three poles 140 vertically passes to extend and be fixed to the ground so as to maintain safety even against strong wind.

Figure 17:
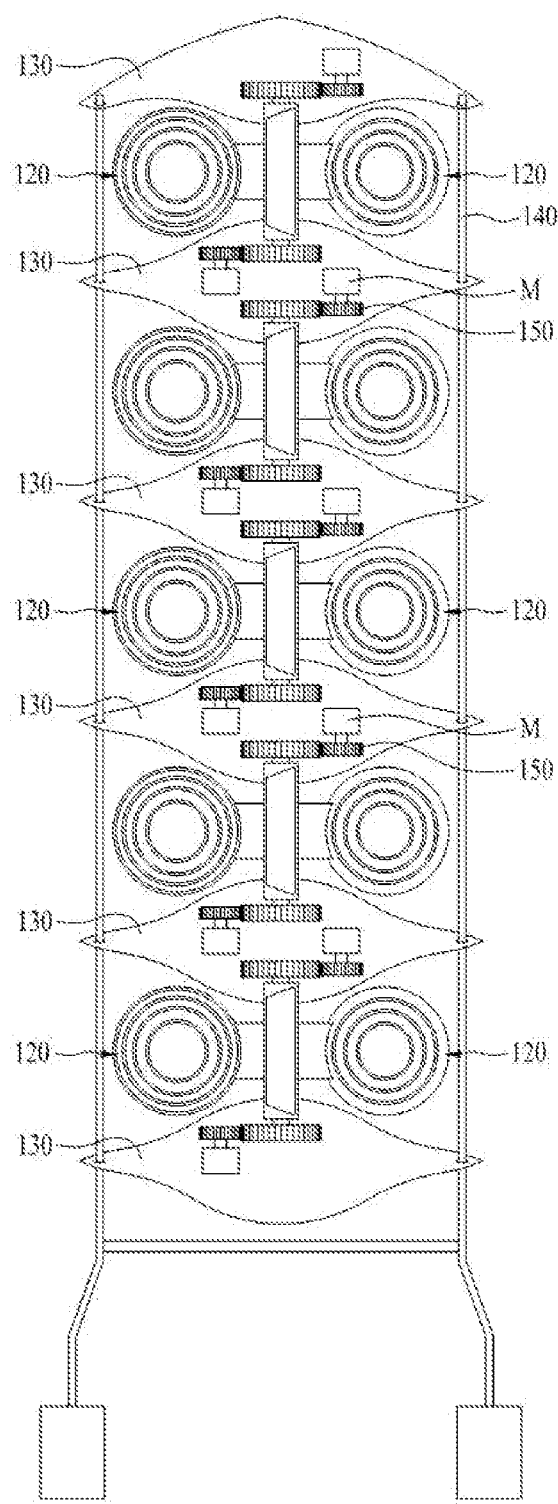
FIG. 17 is a cross-sectional view illustrating the inside of a vertical axis wind turbine generator provided as a multi-stage tower type according to the present invention.

FIG. 17 is a cross-sectional view illustrating the inside of a vertical axis wind turbine generator provided in a multi-stage tower type according to the present invention.

In the vertical axis wind turbine generator provided in a tower type, a conical frame 130 is provided between multiple stages, two generating devices M and an accelerating gear 150 are mounted in the conical frame 130, and four poles 140 vertically pass through an outer circumference of the conical frame 130 to extend and be fixed to the ground.

Figure 18:
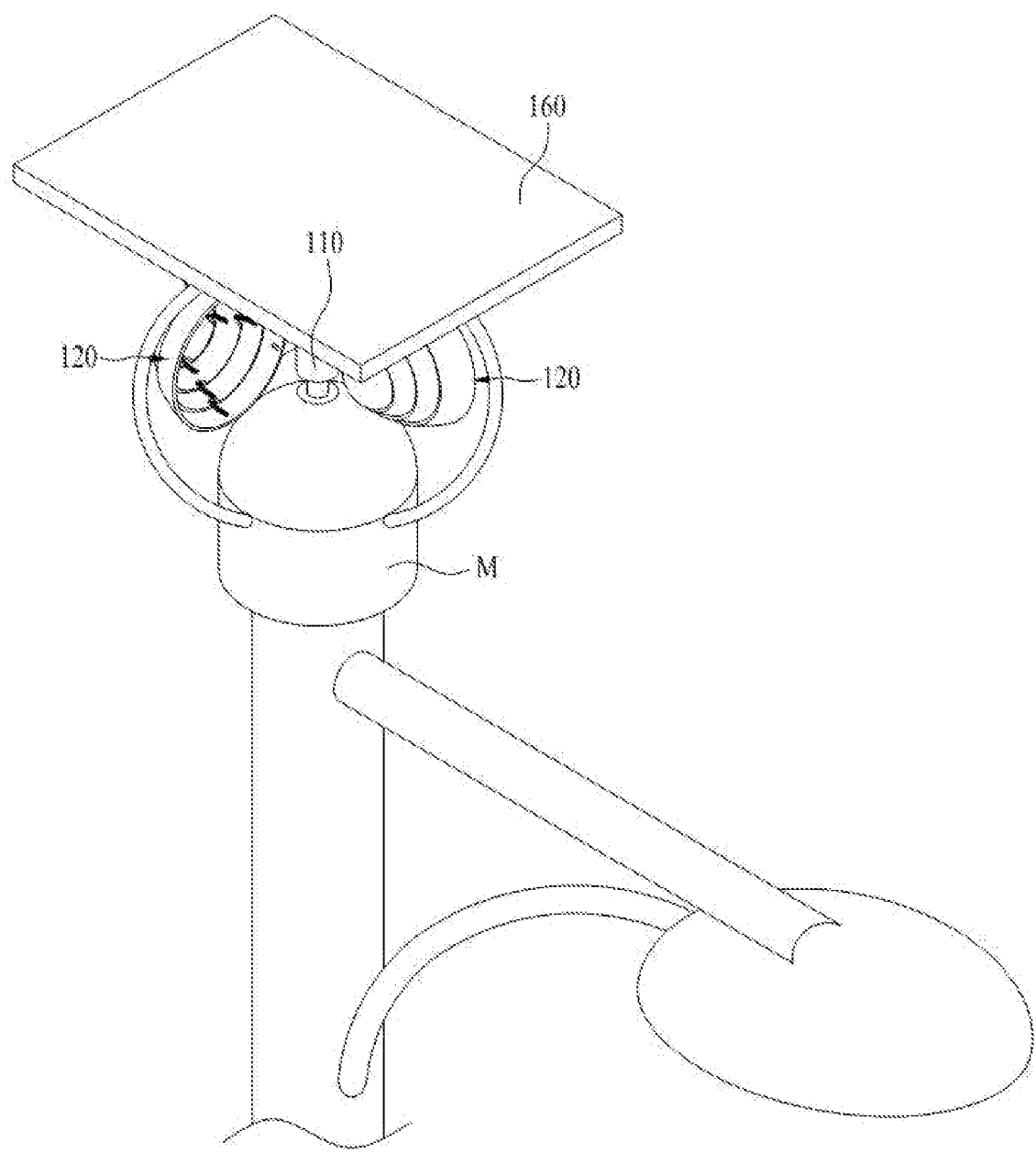
FIG. 18 illustrates a state in which a vertical axis wind turbine generator is provided as a small-sized one-stage type and is installed on an upper end of a streetlight pole according to the present invention.

FIG. 18 is a side view of a state in which a vertical axis wind turbine generator is provided as a small-sized one-stage type and is installed on an upper end of a streetlight pole according to the present invention.

As provided as a small-sized one-stage type, the vertical axis wind turbine generator may be installed in neighborhood areas, and may be installed in the suburban houses or on rooftops of neighborhood buildings, in addition to streetlights, so that electricity necessary in lives is produced. When the vertical axis wind turbine generator is on a streetlight, a solar panel 160 may be installed on an upper portion of a power generator.

In the vertical axis wind turbine generator according to the present invention, the power generating device is mounted on each of upper and lower ends of the rotor blade rotating shaft 110. However, the power generating device M installed on the upper end of the streetlight pole as in FIG. 18 is mounted only on the lower end.

In the vertical axis wind turbine generator according to the present invention, the rotor blade 120 is divided into the fixed blade 120*a* and the movable blade, and the movable blade moving due to the wind pressure is connected to the inside of the fixed blade 120*a* so that the wind hole 120*e* defined at the center of the fixed blade 120*a* is closed or opened. Accordingly, when the backwind blows, the wind pressure of the blade is generated to the maximum, and when the headwind blows, the wind pressure of the blade is minimized to enhance the torque of the rotor blade 120.

In addition, when provided as the small-sized one-stage type, the vertical axis wind turbine generator may be possible to install in small areas, and thus be installed in the suburban houses, the rooftops of the buildings, or upper ends of streetlights to produce electricity necessary in neighborhood lives.

Moreover, when the vertical axis wind turbine generator is provided as a multi-stage type, a plurality of power generating devices M may be possible to install in one power generation facility to increase space utilization.

Furthermore, when the vertical axis wind turbine generator is provided as a multi-stage tower type, the conical frame 130 in which the space is defined may be provided between multiple stages in layers, and the at least three poles 140 may pass through the outer circumference of the conical frame 130 to extend and be fixed to the ground so that the wind turbine generator sufficiently withstands even the strong wind.

Although the embodiments of the present invention have been described, it is understood that the present invention should not be limited to these embodiments but various changes and modifications can be made by one ordinary skilled in the art within the spirit and scope of the present invention as hereinafter claimed.

What is claimed is:

1. A vertical axis wind turbine generator in which a rotary shaft is provided to be perpendicular to the ground, the vertical axis wind turbine generator comprising:
    at least two conical frames (130) which are provided in layers and each of which has an inner space;
    at least three poles (140) vertically passing through an outer circumference of the conical frame (130) to be fixed to the ground;
    a rotor blade rotating shaft (110) installed vertically and configured to rotate between the conical frame (130) and the conical frame (130);
    at least three rotor blades (120), each of which is divided into a fixed blade (120a) and movable blades (120b, 120c and 120d) and has a center in which a wind hole having a circular shape is defined, and which are connected to the rotor blade rotating shaft (110) at the same interval;
    wherein the fixed blade (120a) is connected to the rotor blade rotating shaft (110) through a fixed blade connecting frame (120g);
    wherein a first movable blade (120b) is connected to the inside of the fixed blade (120a) through four elastic bands (120f),
    wherein two of the four elastic bands (120f) are connected to upper left and right portions of the inside of the fixed blade (120a) and upper left and right side surfaces of the first movable blade (120b), and the other two elastic bands (120f) are connected to lower left and right portions in the same method,
    wherein with the fixed blade (120a) connected to the first movable blade (120b) as above, when a wind pressure is generated by a backwind, a portion, which has a small diameter, of the first movable blade (120b) is inserted to protrude into the wind hole of the fixed blade (120a), and a portion having a large diameter is in a state of being hooked with the wind hole of the fixed blade (120a);
    wherein a second movable blade (120c) is connected to the inside of the first movable blade (120b) through four elastic bands (120f) in the same method as the fixed blade (120a) and the first movable blade (120b), wherein when a wind pressure is generated by the backwind, a portion, which has a small diameter, of the second movable blade (120c) is inserted and protrudes from a wind hole of the first movable blade (120b), and a portion having a large diameter is in a state of being blocked by the wind hole of the first movable blade (120b);
    wherein a third movable blade (120d) is connected to the inside of the second movable blade (120c) through four elastic bands (120f) in the same method as above, wherein when a wind pressure is generated by the backwind, a portion, which has a small diameter, of the third movable blade (120d) is inserted and protrudes from the wind hole of the second movable blade (120c), and a portion having a large diameter is in a state of being blocked by a wind hole of the second movable blade (120c) so that the rotor blade is completed, wherein when the wind pressure of the backwind is applied, the entire configuration of the rotor blade (120) is provided as a bowl shape to generate the wind pressure of the backwind to the maximum;
    wherein the rotor blade (120) to which a headwind is applied, the movable blades (120b, 120c, 120d) are connected to each other with maintaining spacing inside the fixed blade (120a) so that the rotor blade (120) has a shape in which the wind hole is opened;
    an accelerating gear (150) installed in the conical frame (130) and connected to each of upper and lower ends of the rotor blade rotating shaft (110); and
    a power generating device (M) connected to the accelerating gear (150) and configured to produce electricity.

* * * * *